United States Patent
Branecky

(10) Patent No.: US 12,442,561 B1
(45) Date of Patent: Oct. 14, 2025

(54) WATER HEATING SYSTEM AND METHOD OF OPERATING THE SAME

(71) Applicant: A. O. SMITH CORPORATION, Milwaukee, WI (US)

(72) Inventor: Brian Branecky, Oconomowoc, WI (US)

(73) Assignee: A. O. SMITH CORPORATION, Milwaukee, WI (US)

(*) Notice: Subject to any disclaimer, the term of this patent is extended or adjusted under 35 U.S.C. 154(b) by 0 days.

(21) Appl. No.: 18/665,183

(22) Filed: May 15, 2024

Related U.S. Application Data

(63) Continuation of application No. 17/555,711, filed on Dec. 20, 2021, now Pat. No. 12,098,867.

(60) Provisional application No. 63/129,160, filed on Dec. 22, 2020.

(51) Int. Cl.
| | |
|---|---|
| F24H 15/36 | (2022.01) |
| F24H 1/00 | (2022.01) |
| F24H 9/20 | (2022.01) |
| F24H 15/238 | (2022.01) |
| F24H 15/31 | (2022.01) |
| F24H 15/421 | (2022.01) |

(52) U.S. Cl.
CPC .......... *F24H 15/36* (2022.01); *F24H 1/0027* (2013.01); *F24H 9/2035* (2013.01); *F24H 15/238* (2022.01); *F24H 15/31* (2022.01); *F24H 15/421* (2022.01)

(58) Field of Classification Search
CPC ...... F24H 15/36; F24H 1/0027; F24H 9/2035; F24H 15/238; F24H 15/31; F24H 15/421
See application file for complete search history.

(56) References Cited

U.S. PATENT DOCUMENTS

| | | | |
|---|---|---|---|
| 4,682,946 | A | 7/1987 | Kasada |
| 5,971,745 | A | 10/1999 | Bassett et al. |
| 6,299,433 | B1 | 10/2001 | Gauba et al. |
| 2010/0291494 | A1 | 11/2010 | Branecky et al. |

(Continued)

FOREIGN PATENT DOCUMENTS

| | | |
|---|---|---|
| EP | 0104586 A2 | 4/1984 |
| GB | 2081905 A | 2/1982 |
| JP | 2647840 B2 | 8/1997 |

OTHER PUBLICATIONS

JP_2647840_B2.pdf English translation (Year: 1997).*
Dakota Instruments (Year: 2016).
Dakota Instruments Accessibility Date (Year: 2022).

*Primary Examiner* — Steven S Anderson, II
*Assistant Examiner* — Kurt Wolford
(74) *Attorney, Agent, or Firm* — Michael Best & Friedrich LLP

(57) ABSTRACT

A water heating system includes a burner and a gas valve fluidly connected to the burner to deliver a flow of combustible gas thereto. The gas valve has an adjustable throttle for the flow of combustible gas, along with a motor to adjust a position of the throttle. A controller is configured to determine a throttle position corresponding to a target air-fuel ratio of the burner during a calibration sequence, and to control the motor in order to operate the burner at that target air-fuel ratio throttle position during a start sequence.
The controller is configured to monitor a characteristic of the burner during the start sequence, and to initiate the calibration sequence if the monitored characteristic exceeds an error threshold.

15 Claims, 3 Drawing Sheets

(56) References Cited

U.S. PATENT DOCUMENTS

| | | |
|---|---|---|
| 2010/0330520 A1 | 12/2010 | Kanda |
| 2016/0281984 A1 | 9/2016 | Munsterhuis et al. |
| 2017/0292698 A1* | 10/2017 | Langius .................. F23N 5/126 |
| 2020/0063890 A1 | 2/2020 | Senkyr et al. |
| 2020/0232643 A1 | 7/2020 | Henrich et al. |
| 2021/0364165 A1 | 11/2021 | Munsterhuis |

* cited by examiner

WATER HEATING SYSTEM AND METHOD OF OPERATING THE SAME

CROSS-REFERENCE TO RELATED APPLICATIONS

This application claims the benefit of non-provisional patent application Ser. No. 17/555,711, filed on Dec. 20, 2021, which claims priority to provisional patent application No. 63/129,160, filed on Dec. 22, 2020, the entire contents of which are hereby incorporated by reference.

BACKGROUND

Tank water heaters are used to heat a volume of water stored in a tank in order to provide a source of heated water, such as for domestic use. Often, the heat source used for heating the water is a combustion burner integrated with the tank water heater. A fuel such as propane or natural gas is combusted with ambient air within the burner, and the resultant products of combustion are placed in heat exchange relationship with the water in the tank in order to heat the water.

In order to balance the competing concerns of maximizing the fuel efficiency of the water heater and preventing or minimizing the formation of undesirable products of combustion (such as oxides of nitrogen and carbon monoxide, for example) it is desirable that the burner be operated at an optimum air-fuel ratio. The optimum air-fuel ratio is typically slightly lean of stoichiometric, and is often expressed as an "air lambda" value, calculated as the air mass flow rate relative to the stoichiometric air mass flow rate for the given fuel mass flow rate. An air lambda greater than unity therefore indicates a fuel-lean combustion condition, whereas an air lambda of less than unity indicates a fuel-rich combustion condition.

To account for various factors such as, for example, flow restrictions related to the installation of the water heater and the heating value of the fuel (among others) it is common for a gas valve provided with the water heater for the purpose of metering the flow of combustible gaseous fuel to be adjustable, so that the target air-fuel ratio can be achieved and maintained. Such adjustability can be provided by way of an adjustable throttle, which can be adjusted and set during commissioning and/or service of the water heater by a technician.

In some applications, it has become desirable for the gas valve to be capable of operation at certain operating conditions by adjusting the air-fuel ratio. Such capability can be achieved by using a motor (for example, a stepper motor) to provide precise adjustment of the throttle. However, by their nature stepper motors operate in an open-loop fashion, and are therefore susceptible to drifting without the inclusion of feedback control, which adds undesirable expense. As a result, it is possible that the stepper motor will not be able to return to the optimum air-fuel ratio position, thereby resulting in either inefficient operation or the production of unacceptably high levels of pollutants.

SUMMARY

According to an embodiment of the invention, a water heating system includes a burner and a gas valve fluidly connected to the burner to deliver a flow of combustible gas thereto. The gas valve includes an adjustable throttle for the flow of combustible gas, along with a stepper motor that is operatively coupled to the throttle in order to adjust a position of the throttle.

A controller is operatively coupled to the stepper motor. The controller is configured to determine a throttle position corresponding to a target air-fuel ratio of the burner during a calibration sequence. The controller is further configured to control the stepper motor in order to operate the burner at that target air-fuel ratio throttle position during a start sequence.

In some embodiments, the controller is further configured to monitor a characteristic of the burner during the start sequence, in order to determine if the characteristic exceeds an error threshold. The controller is configured to initiate the calibration sequence in response to the monitored characteristic exceeding the error threshold.

According to some embodiments, the water heating system also includes a blower that is operatively coupled to the controller. The blower is fluidly connected to the burner in order to deliver a flow of combustion air to the burner. The controller is configured to operate the blower at a variety of speeds in order to modulate the airflow to the burner, so that the heat output of the burner can be varied according to the demand.

In some embodiments, the controller is configured to operate the blower at a reference speed setting during the calibration sequence. The reference speed setting can be programmed into the controller, and can for example be a percentage of the maximum speed of the blower. The controller can be configured to detect a value of the monitored characteristic at the reference speed setting of the blower and at the throttle position corresponding to the target air-fuel ratio of the burner during the calibration setting.

In some such embodiments, the water heating system further includes a memory. The controller can store information in the memory, and can retrieve stored information from the memory. The controller is configured to store the value of the monitored characteristic in the memory as a stored value of the characteristic during the calibration sequence, and to compare the characteristic to the stored value during the start sequence in order to determine if the characteristic exceeds the error threshold.

In some embodiments, the controller is configured to adjust the throttle to a second throttle position in order to ignite the burner at that second throttle position at an initiation of the start sequence. The second throttle position is different than the first throttle position. After igniting the burner at that second throttle position, the controller returns the throttle to the first throttle position. In some embodiments, the second throttle position corresponds to a predetermined number of steps of a stepper motor from the first throttle position. The predetermined number of steps can be stored in the memory.

In some embodiments, a flame rod is arranged within the burner. The flame rod is in communication with the controller, and the monitored characteristic is an electrical signal that is provided by the flame rod. In some such embodiments, the characteristic is a flame rectification current.

According to another embodiment of the invention, a method of operating a water heating system includes operating a motor to adjust a combustible gas throttle from a run setting to a start setting, and igniting a burner using a flow of gas passing through the throttle at the start setting. The method further includes operating the motor to adjust the throttle to the run setting after igniting the burner, operating the blower at a reference setting of the blower, and measuring a value of a characteristic of the burner at the reference setting of the blower and the run setting of the throttle.

In at least some embodiments, the method includes retrieving a stored value of the characteristic from a memory, and determining a difference between the measured value of the characteristic and the stored value of the characteristic, If the difference exceeds a predetermined error threshold, a calibration sequence of the throttle is initiated.

In some embodiments, the motor is a stepper motor. The step of operating the stepper motor to adjust a combustible gas throttle from a run setting to a start setting can include moving the stepper motor a predetermined number of steps in a first direction of the stepper motor. In some embodiments the step of operating the stepper motor to adjust the throttle to the run setting after igniting the burner includes moving the stepper motor the predetermined number of steps in a second direction of the stepper motor opposite the first direction.

In some embodiments, the method further includes initiating a calibration sequence, operating the blower at a low speed setting, igniting the burner at that low speed setting, and monitoring a second characteristic of the burner. The stepper motor is operated to adjust throttle position until the second characteristic indicates a stoichiometric air-fuel ratio in the burner, and the motor is then operated to open the throttle by a predetermined amount from that throttle position to a lean target air-fuel ratio. The throttle position is locked as the run setting of the throttle at that target air-fuel position. The blower speed is then increased to the reference setting of the blower, and the value of the first characteristic is measured and stored in the memory.

In some such embodiments, the second characteristic is an ionization voltage measured between a flame ionization sensor and an electrically grounded surface of the burner.

In some embodiments, operating the stepper motor to adjust the throttle position until the second characteristic indicates a stoichiometric air-fuel ratio in the burner includes monitoring the second characteristic at varying positions of the motor to determine a position of the motor at which the ionization voltage changes from negative to positive or from positive to negative.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
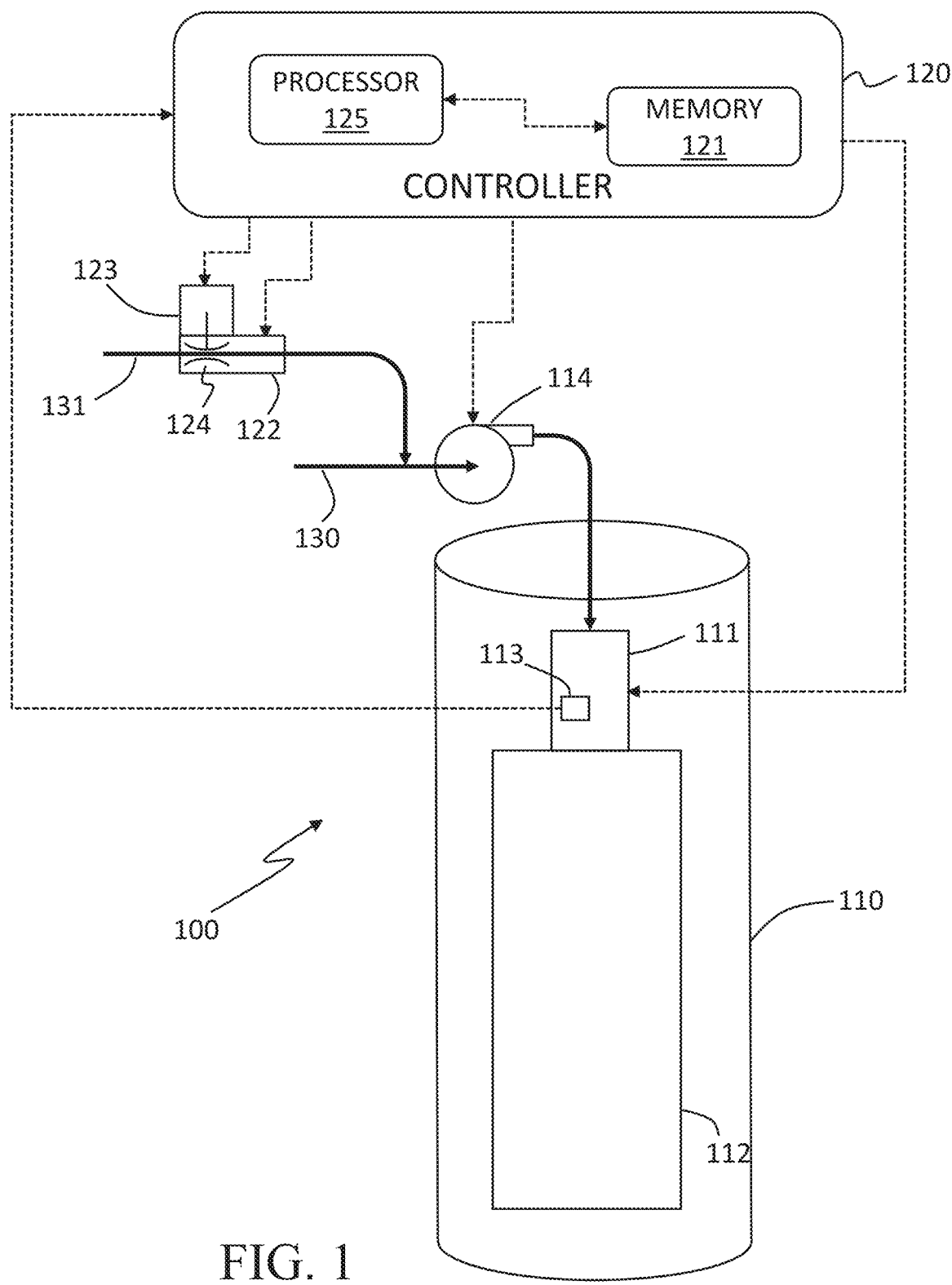
FIG. 1 is a schematic diagram of portions of a tank water heating system according to an embodiment of the invention.

FIG. 1 is a schematic diagram of portions of a tank water heating system 100 according to some embodiments. A water heating system 100 includes a tank 110 to store a volume of water there within, and a burner 111 and heat exchanger 112 integrated with the tank 110. The tank 110 as depicted is constructed as a steel cylinder, and can be constructed in various ways known in the art. By way of example, the tank 110 can be constructed of stainless steel, or can be glass-lined on internal surfaces, in order to prevent corrosion of the tank 110 by the water. The heat exchanger 112 can be constructed in various ways, such as for example as a coiled fire-tube that is immersed within the water of the tank 110, and can include two or more sequentially arranged heat exchangers of differing constructions. The burner 111 and the heat exchanger 112 are connected so that products of combustion produced within the burner 111 are routed to the heat exchanger 112 as a hot flue gas, and flow through the heat exchanger 112 in order to transfer heat from the flue gas to the water within the tank 110. Although not shown, an exhaust flue connected to the heat exchanger 112 removes the cooled flue gas from the water heating system 100.

A blower 114 is further provided as part of the water heating system 100, and provides a supply of combustion air 130 to the burner 111 during operation of the water heating system. The source of the air 130 can be from the immediate environment surrounding the water heating system 100, or it can alternatively be from a remote location and delivered to the blower by way of ducting.

A gas valve 122 is also provided as part of the water heating system 100. A source of combustible gas 131 is connected to an inlet of the gas valve 122, and an outlet of the gas valve 122 is connected to a location along the combustion air flow path to the burner 111. During operation of the water heating system 100, the combustible gas 131 is delivered into the combustion air flow 130 through the valve 122, and the combined air and combustible gas is delivered to the burner 111 as premixed air and fuel combustion reactants.

A controller 120 is communicatively coupled to the blower 114 and the gas valve 122. Upon receiving a signal indicating a call for heating (e.g. by a thermostat arranged to sense the temperature of the water within the tank 110 and communicatively coupled to the controller 120), the controller sends a signal to the blower 114 in order to cause the blower to operate and deliver a flow of air to the burner. The controller also sends a signal to the gas valve 122 in order to open the gas valve and allow for the flow of combustible gas through the valve. In addition, the controller can be communicatively coupled to the burner 111 and can send an ignition signal to the burner 111 in order to ignite the burner.

The controller 120 includes combinations of hardware and software that provide it the ability to control the operation of various aspects of the water heating system 100, and can be constructed as a single device or as a combination of two or more devices. In one construction, the controller 120 includes one or more printed circuit boards populated with electrical and electronic components such as a processor 125 and a memory 121. The one or more printed circuit boards also includes a bus that interconnects various components, including the processor 125 and the memory 121. The processor 125 can take the form of, for example, a microprocessor, a microcontroller, or another suitable programming device. The memory 121 includes, for example, a read-only memory ("ROM"), a random access memory ("RAM"), an electrically erasable programmable read-only memory ("EEPROM"), a flash memory, a hard disk, or another suitable magnetic, optical, physical, or electronic memory device. The processor 125 is connected to the memory 121 and executes software that is capable of being stored in the RAM (e.g., during execution), the ROM (e.g., on a generally permanent basis), or another non-transitory computer readable medium such as another memory or a disc.

A motor 123 is integrated with the gas valve 122, and is configured to open and close a throttle 124 located within the gas valve 122 and along the gas flow path. By way of example, the motor 123 can be a stepper motor, but can alternatively be another type of motor. The controller 120 is communicatively coupled to the motor 123, and is configured to selectively command the motor 123 in order to operate the throttle 124.

During operation of the water heating system 100, the heat output of the burner 111 can be controlled by the controller 120 by sending signals to the blower 114 in order to modulate the speed of the blower 114, thereby adjusting the flow rate of air supplied to the burner 111. When the gas valve 122 is commanded to be open and the blower is providing air, the combustible gas 131 passes through the valve 122 and into the flow of air 130 in proportion to the flow rate of air. The throttle 124 can be set at an appropriate opening setting to maintain the desired ratio of fuel to air as the heat output of the burner is modulated.

The air-fuel ratio can be influenced by a variety of factors, including but not limited to the type and quality of fuel, the pressure of the source of fuel, the altitude of the water heating system, and others. The gas valve 122 is provided with the throttle 124 at least in part to accommodate these variabilities for each installation of the water heating system 100. The throttle 124 provides the ability to restrict the flow of combustible gas in order to set the air-fuel ratio at the desired setting for the water heating system. Since many of the factors that can influence the air-fuel ratio do not vary over time, once the air-to-fuel ratio is set for the installation (e.g. at the time that the water heating system is commissioned), it may not need to be further adjusted. However, in some cases it may be desirable to operate the burner 111 at more than one air-fuel ratio. In such cases, the motor 123 can be used to change the opening of the throttle between two or more settings in order to adjust the air-fuel ratio as needed. As one example, it may be desirable to ignite the burner at a richer air-fuel ratio than the one that is desirable for normal, steady operation of the burner after ignition. Such a richer ignition can be advantageous in that it can provide for easier ignition and/or for reduced audible noise during the ignition. Once the flame has been ignited, however, it is desirable to operate the burner at the leaner target air-fuel ratio.

A sensor 113 is integrated into the burner 111, and is communicatively coupled to the controller 120 in order to communicate one or more characteristics of the burner operation to the controller 120. In an exemplary embodiment, the sensor 113 is a flame rod that uses the principle of flame rectification to operate as an ionization current flame detector. During operation of the burner 111, an AC signal is applied to the flame rod and the resulting flame rectification current that flows between the flame rod and a ground electrode (for example, another portion of the burner) through the ionized gases of the flame is provided to the controller as a measured characteristic of the burner operation. The value of the flame rectification current can vary due to many factors, including but not limited to corrosion of the flame rod, the positioning of the flame rod relative to the ground electrode, the heating value of the fuel, the burner heat output, the air-fuel ratio, and others.

The sensor 113 can additionally be used to find a position of the throttle 124 that approximately provides the stoichiometric air-fuel ratio, the ratio at which the amount of oxygen in the reactant flow is exactly sufficient to completely oxidize the fuel in the reactant flow. The sensor 113 can monitor a flame ionization voltage between the sensor and the ground electrode with respect to a variation of the air-fuel ratio as a second characteristic of the burner operation. The flame ionization voltage tends to have a fairly constant, positive value when the flame is lean of stoichiometric. However, as the air-fuel ratio drops below stoichiometric the flame ionization voltage will rapidly drop and will even reverse polarity so as to become negative. Using this phenomenon (sometimes referred to as flame ionization voltage reversal), the throttle location at approximately stoichiometric can be determined by opening and closing the throttle and identifying the throttle position at which the polarity of the flame ionization voltage switches from positive to negative (when the motor is operating to decrease the air lambda) or from negative to positive (when the motor is operating to increase the air lambda).

Figure 2:
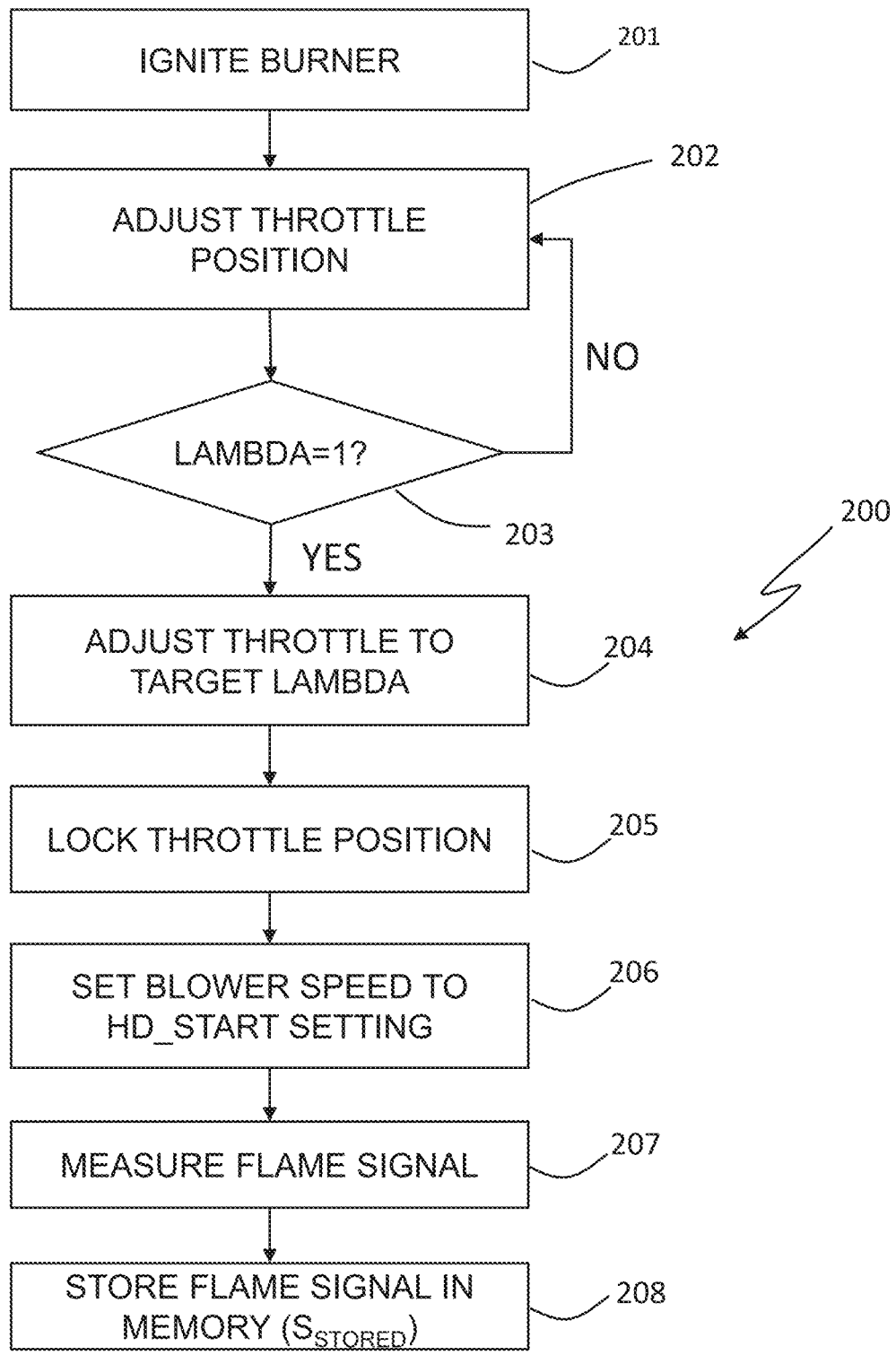
FIG. 2 is a flow diagram of a calibration sequence of a water heating system according to an embodiment of the invention.

FIG. 2 illustrates a calibration sequence 200 of the water heating system 1, wherein the throttle is set to a desired air-fuel ratio. At the initiation of the calibration sequence 200, controller 120 ignites the burner 111 (step 201). The step 201 of igniting the burner includes, for example, commanding the blower 114 to operate at a predetermined ignition setting (for example, 75% of full load), opening the gas valve 122 to allow for the flow of gas, sending an ignition signal to the burner 111, and monitoring a characteristic of the burner 111 via the sensor 113 in order to confirm that a flame is present. Once the burner 111 is ignited, the controller 120 uses the motor 123 to adjust the position of the throttle 124 in order to vary the air-fuel ratio (step 202). The throttle 124 can be adjusted by starting at a relatively open throttle position and using the motor 123 to progressively restrict the throttle, or by starting at a relatively closed throttle position and using the motor 123 to progressively open the throttle. During this step, the speed of the blower 114 can be maintained at a relatively low speed, so that the production of undesirable byproducts of combustion that may result from operating the burner 111 at sub-optimum air-fuel ratios is minimized.

In step 203, the controller monitors a characteristic of a flame signal (e.g. flame ionization voltage) provided by the sensor 113, and determines if the air lambda is equal to unity (i.e. if the air-fuel ratio at that throttle setting is stoichiometric) by determining if the adjustment to the throttle position results in a polarity change of the characteristic. If the controller determines that the current throttle position does not provide an approximately stoichiometric air-fuel ratio (i.e. does not detect a polarity change), step 202 is repeated to again adjust the throttle position. In some cases the controller may overshoot the stoichiometric throttle position, and the adjustment of the throttle may vary between opening the throttle and closing the throttle.

Once the controller determines that the current setting of the throttle provides an approximately stoichiometric air-fuel ratio, the controller 120 then operates the motor 123 to adjust the throttle to a target air lambda (step 204). By way of example, the target air lambda can be equal to about 1.25, so that the burner is operated with 25% excess air. This setting can, for example, be pre-programmed into the memory 121 as a fixed number of steps of the stepper motor 123, in the direction of throttle opening, from the stoichiometric setting. After adjusting the throttle to that target lambda setting, the position of the stepper motor 123 is locked in order to lock the throttle 124 at that position (step 205).

Once the throttle position is locked, the controller 120 sends a signal to the blower 114 in order to increase the speed of the blower 114 to a speed that is pre-programmed in the memory 121 as the heat demand start speed ("HD_START"), a parameter for the speed at which the blower will operate at the start of a heat demand (step 206). The parameter HD_START can be a percentage of the blower speed corresponding to the maximum heat demand of the water heating system, for example 70% of the maximum heat demand blower speed. The flow rate of combustible gas 131 though the valve 122 will also increase correspondingly, with the air-fuel ratio remaining fixed due to the throttle position being locked.

With the burner 111 operating at the HD_START blower speed and the target air-fuel ratio, the flame signal (e.g. the flame rectification current) is measured by the sensor 113 (step 207) and is communicated to the controller 120 to be stored in the memory 121 as parameter $S_{STORED}$ (step 208). The calibration sequence 200 is then terminated.

Figure 3:
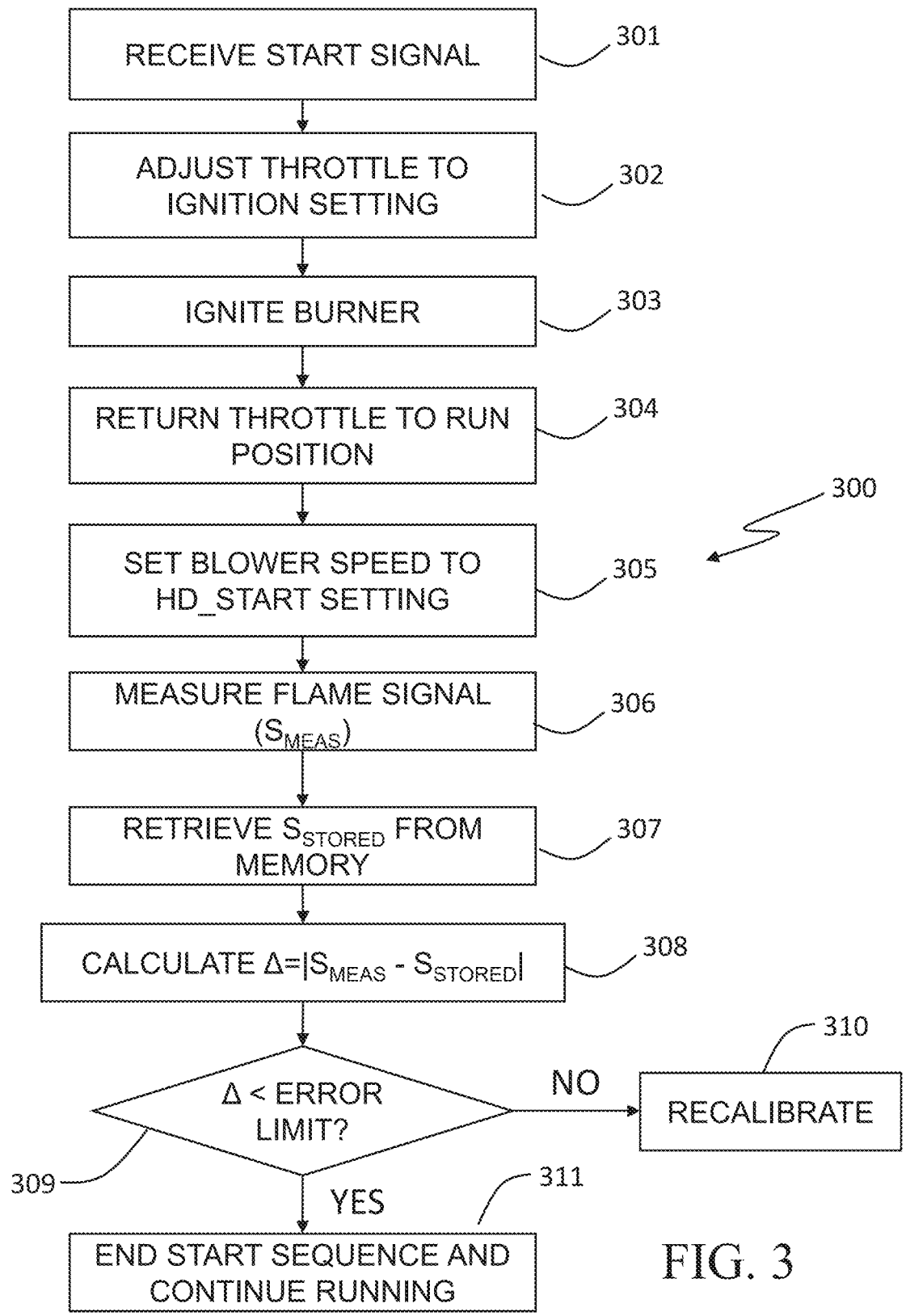
FIG. 3 is a flow diagram of a start sequence of a water heater heating system according to an embodiment of the invention.

Turning now to FIG. 3, a start sequence 300 of the water heating system is illustrated. The start sequence 300 begins when the controller 120 receives a start signal (step 301). Such a start signal can, for example, be received as a signal from a sensor disposed within the tank 110 to measure the temperature of the water at a location within the tank. The start signal indicates a demand for heating of the water within the tank 110 by the burner 111 and heat exchanger 112.

It can be particularly desirable, in at least some instances, to ignite the burner 111 at a fuel-air ratio that is different than the target air-fuel ratio at which the throttle 124 was set during the calibration sequence 200. For example, it may be desirable to have a richer air-fuel ratio at ignition of the burner in order to provide a smoother ignition. Accordingly, after having received the start signal in step 301, the controller operates the stepper motor 123 a predetermined number of steps in order to adjust the position of the throttle 124 from the locked position to an ignition setting (step 302). The burner is then ignited (step 303) by the controller 120 starting the blower 14, opening the gas valve 122, and sending an ignition signal to the burner 111.

Once ignition of the burner 111 is achieved, the controller 120 operates the motor 123 to return the throttle 124 back to the position that corresponds to the target air-fuel ratio (step 304). Since the stepper motor 123 was operated a predetermined number of steps in one direction in 302, the throttle 124 can be returned to its previous position by operating the stepper motor 123 the same number of steps in the opposite direction in 304.

Stepper motors may be susceptible to a phenomenon known as drifting, wherein the actual rotational steps experienced by the motor is other than the number of steps commanded. If the stepper motor 123 drifts as the throttle is adjusted in either or both of steps 302 and 304, then the actual position of the throttle 124 at the conclusion of step 304 may be different than the throttle position that was determined to yield the target air-fuel ratio during the calibration sequence 200. Drifting of the stepper motor 123 can therefore result in sub-optimal operation of the water heating system 100. In order to prevent this situation, the controller 120 checks that the air-fuel ratio is within an error threshold during the start sequence 300.

After having returned the throttle 124 to the run position in step 304, the controller 120 sets the blower speed to the HD_START setting (step 305). The controller 120 next measures the resultant flame signal characteristic by way of the sensor 113, and assigns the value of the characteristic to a parameter $S_{MEAS}$ (step 306). The controller 120 retrieves the value of the parameter $S_{STORED}$ from the memory 121 (step 307), and calculates a deviation ($\Delta$) as the absolute value of the difference between the parameters $S_{MEAS}$ and $S_{STORED}$ (step 308). The resultant deviation is compared to a pre-programmed error threshold (step 309). If the deviation is less than the error threshold, the start sequence is concluded and the water heating system 100 transitions to a running mode, in which the burner 111 operates at a desired heat output (step 311). If the deviation exceeds the error threshold, a recalibration is initiated (step 310), and the calibration sequence 100 is performed in order to reset the throttle position.

The start sequence 300 can allow for the water heating system 100 to operate without requiring positional feedback from the motor 123 in order to ensure that the throttle 124 remains at the desired settings. Since the start sequence 300 measures the flame signal at a fixed blower speed (the HD_START setting) to determine whether a recalibration is needed, only a single reference value needs to be stored in the memory. In addition, the water heating system 100 can correct for other occurrences that cause changes in the flame monitoring signal, such as corrosion or bending of the flame rod.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A water heating system comprising:
   a burner;
   a gas valve fluidly connected to the burner to deliver a flow of combustible gas thereto, the gas valve including an adjustable throttle for the flow of combustible gas and a motor operatively coupled to the throttle in order to adjust a position of the throttle; and
   a controller operatively coupled to the motor, the controller configured to:
      determine a first throttle position corresponding to a target air-fuel ratio of the burner during a calibration sequence;

control the motor to operate the gas valve at a second throttle position during a start sequence, the second throttle position corresponding to a richer air-fuel ratio than the first throttle position;

initiate ignition of the burner while the gas valve is at the second throttle position;

control the motor to transition the gas valve from the second throttle position to the first throttle position during the start sequence after ignition of the burner;

while the gas valve is at the first throttle position, measure a value of a characteristic of the burner operation during the start sequence to determine if an error threshold is exceeded; and initiate the calibration sequence only in response to the error threshold being exceeded.

2. The water heating system of claim 1, further comprising:

a blower operatively coupled to the controller, the blower being fluidly connected to the burner to deliver a flow of combustion air thereto; and a memory, wherein the controller is further configured to:

operate the blower at a reference speed setting during the calibration sequence;

during the calibration sequence, detect a value of the characteristic at the reference speed setting and the first throttle position, and store said value of the characteristic in the memory as a stored value of the characteristic; and during the start sequence, compare the measured value of the characteristic to the stored value in order to determine if the error threshold is exceeded.

3. The water heating system of claim 2, wherein the controller is further configured to determine a stoichiometric throttle position during the calibration sequence.

4. The water heating system of claim 3, wherein the characteristic is a first characteristic and wherein the controller is configured to measure a value of a second characteristic in order to determine the stoichiometric throttle position.

5. The water heating system of claim 4, further comprising a flame rod by which the controller measures both the first characteristic and the second characteristic.

6. The water heating system of claim 4, wherein the first characteristic is a flame rectification current and the second characteristic is a flame ionization voltage.

7. The water heating system of claim 1, wherein the motor is a stepper motor and wherein the second throttle position corresponds to a predetermined number of steps of the stepper motor from the first throttle position.

8. The water heating system of claim 1, further comprising a flame rod arranged within the burner and in communication with the controller, wherein the characteristic is an electrical signal provided by the flame rod.

9. The water heating system of claim 8, wherein the characteristic is a flame rectification current.

10. A method of operating a water heating system, comprising:

operating a motor to adjust a combustible gas throttle from a run setting to an ignition setting by moving the motor a predetermined number of steps in a first direction of the motor;

igniting a burner using a flow of gas passing through the throttle at the ignition setting;

operating the motor to adjust the throttle to the run setting after igniting the burner by moving the motor the predetermined number of steps in a second direction of the motor opposite the first direction;

operating a blower at a reference setting of the blower;

measuring a value of a characteristic of the burner at the reference setting of the blower and the run setting of the throttle;

retrieving a stored value of the characteristic from a memory;

determining a difference between the measured value of the characteristic and the stored value of the characteristic; and initiating a calibration sequence of the throttle only if the difference exceeds a predetermined error threshold.

11. The method of claim 10, wherein the characteristic is a current flow between a flame ionization sensor and an electrically grounded surface of the burner.

12. The method of claim 10, wherein the characteristic is a first characteristic, further comprising:

initiating a calibration sequence;

operating the blower at an ignition speed setting;

igniting the burner at the ignition speed setting of the blower;

monitoring a second characteristic of the burner;

operating the motor to adjust the throttle position until the second characteristic indicates a stoichiometric air-fuel ratio in the burner;

operating the motor a predetermined amount from the throttle position corresponding to the stoichiometric air-fuel ratio position to a lean target air-fuel ratio position;

locking the throttle position at the target air-fuel position as the run setting of the throttle;

increasing the blower speed to the reference setting of the blower;

measuring a value of the first characteristic; and storing the measured value of the first characteristic in the memory.

13. The method of claim 12, wherein the first characteristic is a current flow between a flame ionization sensor and an electrically grounded surface of the burner.

14. The method of claim 12, wherein the second characteristic is an ionization voltage measured between a flame ionization sensor and an electrically grounded surface of the burner.

15. The method of claim 14, wherein operating the motor to adjust the throttle position until the second characteristic indicates a stoichiometric air-fuel ratio in the burner includes monitoring the second characteristic at varying positions of the motor to determine a position of the motor at which the ionization voltage changes polarity from negative to positive or from positive to negative.

* * * * *